United States Patent
Yu et al.

(10) Patent No.: US 9,941,968 B2
(45) Date of Patent: Apr. 10, 2018

(54) AUTOMATIC CABLE DISTRIBUTION SWITCH APPARATUS AND SYSTEM, AND AUTOMATIC CABLE DISTRIBUTION SWITCH METHOD

(71) Applicant: HUAWEI TECHNOLOGIES CO., LTD., Shenzhen (CN)

(72) Inventors: Zhongyang Yu, Shenzhen (CN); Yiyong You, Shenzhen (CN); Yufa Han, Shenzhen (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 7 days.

(21) Appl. No.: 15/147,220

(22) Filed: May 5, 2016

(65) Prior Publication Data

US 2016/0248512 A1    Aug. 25, 2016

Related U.S. Application Data

(63) Continuation of application No. PCT/CN2013/090362, filed on Dec. 24, 2013.

(51) Int. Cl.
*H04J 14/00*       (2006.01)
*H04B 10/294*    (2013.01)
(Continued)

(52) U.S. Cl.
CPC ....... *H04B 10/2942* (2013.01); *H04B 1/0007* (2013.01); *H04B 3/58* (2013.01);
(Continued)

(58) Field of Classification Search
CPC ....... G06F 2221/2149; G06F 15/17306; H04L 12/2856; H04W 28/08; H04W 36/14; H04W 92/14
(Continued)

(56) References Cited

U.S. PATENT DOCUMENTS

| | | | |
|---|---|---|---|
| 6,944,664 B1 * | 9/2005 | Chantrain | H04L 12/2856 709/227 |
| 2008/0268809 A1 * | 10/2008 | Busin | H04W 4/02 455/404.2 |
| 2011/0103348 A1 * | 5/2011 | Hori | H04W 36/0055 370/331 |

FOREIGN PATENT DOCUMENTS

| | | |
|---|---|---|
| CN | 1642297 A | 7/2005 |
| CN | 101790108 A | 7/2010 |

(Continued)

OTHER PUBLICATIONS

International Search Report dated Oct. 10, 2014 in corresponding International Application No. PCT/CN2013/090362.

(Continued)

*Primary Examiner* — Don N Vo
(74) *Attorney, Agent, or Firm* — Staas & Halsey LLP

(57) ABSTRACT

The present invention relates to the field of communications technologies, and in particular, discloses an automatic cable distribution switch apparatus and system, and an automatic cable distribution switch method. In this solution, the automatic cable distribution switch apparatus is connected to at least two access network devices; even through a terminal cannot gain local power, when needing to switch from a first device, currently connected to the terminal, of an access network to a second device of the access network, the terminal can send an access network device switch instruction to the automatic cable distribution switch apparatus. In this case, when receiving the access network device switch instruction, the automatic cable distribution switch apparatus can switch the terminal from any access network device to another access network device, thereby achieving an effect that automatic cable distribution switch can be performed when the terminal cannot gain local power.

13 Claims, 4 Drawing Sheets

(51) Int. Cl.
  *H04B 1/00* (2006.01)
  *H04B 3/58* (2006.01)
  *H04B 10/27* (2013.01)
  *H04Q 11/00* (2006.01)
  *H04L 12/28* (2006.01)
(52) U.S. Cl.
  CPC ......... *H04B 10/27* (2013.01); *H04L 12/2856* (2013.01); *H04Q 11/0003* (2013.01)
(58) Field of Classification Search
  USPC .......................................................... 398/45
  See application file for complete search history.

(56) References Cited

FOREIGN PATENT DOCUMENTS

| | | |
|---|---|---|
| CN | 101854562 A | 10/2010 |
| EP | 1988664 A1 | 5/2008 |
| GB | 2319701 A | 5/1998 |

OTHER PUBLICATIONS

European Search Report dated Feb. 15, 2016, in corresponding European Application No. 13900051.7.

* cited by examiner

US 9,941,968 B2

AUTOMATIC CABLE DISTRIBUTION SWITCH APPARATUS AND SYSTEM, AND AUTOMATIC CABLE DISTRIBUTION SWITCH METHOD

CROSS-REFERENCE TO RELATED APPLICATIONS

This application is a continuation of International Application No. PCT/CN2013/090362, filed on Dec. 24, 2013, which is hereby incorporated by reference in its entirety.

TECHNICAL FIELD

The present invention relates to the field of communications technologies, and in particular, to an automatic cable distribution switch apparatus and system, and an automatic cable distribution switch method.

BACKGROUND

The development of communications technologies leads to a growing demand of users for access bandwidth. Because a copper-wire access network cannot satisfy the growing demand for bandwidth, "copper back into the light" has become a necessity for an access network. A PON (Passive Optical Network, passive optical network) system is more widely applied in a broadband access field due to advantages such as large bandwidth, good expansibility, less use of feeder fibers, free of maintenance and power consumption of an active device, and wide coverage. The PON system is shown in FIG. 1.

The PON system provides many application types, such as FTTP (Fiber To The Premise, fiber to the premise), FTTH (Fiber To The Home, fiber to the home), FTTC (Fiber To The Curb, fiber to the curb), and FTTB (Fiber To The Building, fiber to the building). For the FTTC, FTTB, and FTTH, an optical network unit is connected to a distribution point at a level, so as to provide higher bandwidth for access for a terminal served by the distribution point. However, not each terminal served by the distribution point applies for higher bandwidth, and terminals having a demand for higher bandwidth may not apply at the same time. Therefore, a terminal applying for high bandwidth needs to switch, according to a demand, from a connection to a DSLAM (Digital Subscriber Line Access Multiplexer, digital subscriber line access multiplexer) (an access network device) to a connection to an OLT (Optical Line Terminal, optical line terminal) (an access network device). Certainly, the terminal may also switch from the connection to the OLT (an access network device) back to the connection to the DSLAM (an access network device). The foregoing describes a switch, of a terminal, between access network devices of different access networks. Certainly, in an actual application, a terminal may also switch between different devices of a same access network.

At present, whether a terminal switches between access network devices of different access networks or switches between different devices of a same access network, the switch, of the terminal, between access network devices of different access networks or the switch, of the terminal, between different devices of a same access network may be implemented manually. However, this method usually requires that a person performs an on-site operation. Therefore, although a switch, of a terminal, between access network devices of different access networks or a switch, of a terminal, between different devices of a same access network can be implemented through the foregoing process, the foregoing process has defects of being time-consuming and low efficiency.

In order to solve the foregoing problem, an automatic cable distribution switch method is provided, which is mainly that: a terminal interacts with an automatic cable distribution switch apparatus through a high layer, and the terminal sends switch signaling to the automatic cable distribution switch apparatus through the high layer, to instruct the automatic cable distribution switch apparatus to implement a switch, of the terminal, between access network devices of different access networks or implement a switch, of the terminal, between different devices of a same access network. However, the current automatic cable distribution switch method requires that a terminal can gain local power. When a terminal cannot gain local power, the terminal cannot interact with a high layer, and the high layer cannot learn information indicating that a switch needs to be performed on the terminal. Therefore, the high layer cannot send switch signaling to an automatic cable distribution switch apparatus, and the terminal cannot switch between access network devices of different access networks or switch between different devices of a same access network.

Therefore, at present, a method for automatic cable distribution switch when a terminal cannot gain local power does not already exist.

SUMMARY

Embodiments of the present invention provide an automatic cable distribution switch apparatus and system, and an automatic cable distribution switch method, so as to solve a problem in the prior art that automatic cable distribution switch cannot be performed when a terminal cannot gain local power.

Specific technical solutions provided by the embodiments of the present invention are as follows:

A first aspect provides an automatic cable distribution switch apparatus, where the automatic cable distribution switch apparatus is connected to at least two access network devices, and includes at least one relay, a reverse power detection module connected to the at least one relay, and a relay control module that is connected to the reverse power detection module and the at least one relay, where each relay is configured to control a terminal, connected to the relay, to be connected to any access network device of the at least two access network devices within a different time period;

the reverse power detection module is configured to receive an access network device switch instruction sent by the terminal; and the relay control module is configured to adjust a relay connected to the terminal sending the access network device switch instruction, wherein the relay controls the connected terminal to switch from an access network device, currently connected to the terminal, of the at least two access network devices to another access network device of the at least two access network devices.

With reference to the first aspect, in a first possible implementation manner, the relay is a single-throw double-pole switch.

With reference to the first aspect and the first possible implementation manner of the first aspect, in a second possible implementation manner, the reverse power detection module is specifically configured to:

receive an electrical signal sent by the terminal; and the relay control module is specifically configured to:

adjust a relay connected to the terminal sending the electrical signal, wherein the relay controls the connected terminal to switch from an access network device, currently connected to the terminal, of the at least two access network devices to another access network device of the at least two access network devices.

With reference to the first aspect and the first possible implementation manner of the first aspect, in a third possible implementation manner, the reverse power detection module is specifically configured to:

receive a switch signal that is delivered by the terminal by using a radio network controller RNC; and the relay control module is specifically configured to:

adjust a relay connected to the terminal sending the switch signal, wherein the relay controls the connected terminal to switch from an access network device, currently connected to the terminal, of the at least two access network devices to another access network device of the at least two access network devices.

With reference to the first aspect and the first to third possible implementation manners of the first aspect, in a fourth possible implementation manner, the apparatus further includes at least one digital-to-analog conversion module and an electronic switch module connected to both the relay control module and the at least one digital-to-analog conversion module, where each digital-to-analog conversion module is connected to one terminal by using one relay, where each digital-to-analog conversion module is configured to convert an analog signal sent by a terminal connected to the digital-to-analog conversion module into a digital signal, and input the digital signal obtained through conversion to the electronic switch module;

the relay control module is further configured to: after determining that the electronic switch module receives the digital signal, control the electronic switch module to determine, in a digital signal processor DSP of an optical network unit, an idle signal input line that is used to transmit a digital signal input by any digital-to-analog conversion module; and to input, to the switched access network device by using a corresponding idle signal input line in the DSP of the optical network unit, the digital signal that is input by any digital-to-analog conversion module; and the electronic switch module is configured to: under the control of the relay control module, determine, in the DSP of the optical network unit, the idle signal input line that is used to transmit the digital signal input by the any digital-to-analog conversion module; and input, to the switched access network device by using the corresponding idle signal input line in the DSP of the optical network unit, the digital signal that is input by the any digital-to-analog conversion module.

A second aspect provides an automatic cable distribution switch system, including a terminal and an automatic cable distribution switch apparatus connected to at least two access network devices, where the terminal is configured to send an access network device switch instruction to the automatic cable distribution switch apparatus; and the automatic cable distribution switch apparatus is configured to: after receiving the access network device switch instruction sent by the terminal, adjust a relay connected to the terminal sending the access network device switch instruction, wherein the relay controls the connected terminal to switch from an access network device, currently connected to the terminal, of the at least two access network devices to another access network device of the at least two access network devices.

With reference to the second aspect, in a first possible implementation manner, the terminal is specifically configured to:

send an electrical signal to the automatic cable distribution switch apparatus; and the automatic cable distribution switch apparatus is specifically configured to:

adjust a relay connected to the terminal sending the electrical signal, wherein the relay controls the connected terminal to switch from an access network device, currently connected to the terminal, of the at least two access network devices to another access network device of the at least two access network devices.

With reference to the second aspect, in a second possible implementation manner, the terminal is specifically configured to:

deliver a switch signal by using a radio network controller RNC; and the automatic cable distribution switch apparatus is specifically configured to:

adjust a relay connected to the terminal sending the switch signal, wherein the relay controls the connected terminal to switch from an access network device, currently connected to the terminal, of the at least two access network devices to another access network device of the at least two access network devices.

With reference to the first aspect and the first to second possible implementation manners of the first aspect, in a third possible implementation manner, the terminal is further configured to send an analog signal; and the automatic cable distribution switch apparatus is further configured to:

convert the analog signal sent by the terminal into a digital signal;

determine, in a digital signal processor DSP of an optical network unit, an idle signal input line that is used to transmit the digital signal; and input the digital signal to the switched access network device by using a corresponding idle signal input line in the DSP of the optical network unit.

A third aspect provides an automatic cable distribution switch method, where an automatic cable distribution switch apparatus using the method is connected to at least two access network devices, and the method includes:

receiving an access network device switch instruction sent by a terminal; and switching the terminal from any access network device, currently connected to the terminal, of the at least two access network devices to another access network device of the at least two access network devices according to the access network device switch instruction.

With reference to the third aspect, in a first possible implementation manner, the receiving an access network device switch instruction sent by a terminal specifically includes:

receiving an electrical signal sent by the terminal; and the switching the terminal from any access network device, currently connected to the terminal, of the at least two access network devices to another access network device of the at least two access network devices according to the access network device switch instruction specifically includes:

switching the terminal from any access network device, currently connected to the terminal, of the at least two access network devices to another access network device of the at least two access network devices according to the electrical signal.

With reference to the third aspect, in a second possible implementation manner, the receiving an access network device switch instruction sent by a terminal specifically includes:

receiving a switch signal that is delivered by the terminal by using a radio network controller RNC; and the switching the terminal from any access network device, currently connected to the terminal, of the at least two access network devices to another access network device of the at least two access network devices according to the access network device switch instruction specifically includes:

switching the terminal from any access network device, currently connected to the terminal, of the at least two access network devices to another access network device of the at least two access network devices according to the switch signal.

With reference to the third aspect and the first to second possible implementation manners of the third aspect, in a third possible implementation manner, after the switching the terminal from any access network device, currently connected to the terminal, of the at least two access network devices to another access network device of the at least two access network devices according to the access network device switch instruction, the method further includes:

converting a received analog signal sent by the terminal into a digital signal;

determining, in a digital signal processor DSP of an optical network unit, an idle signal input line that is used to transmit the digital signal; and inputting the digital signal to the switched access network device by using a corresponding idle signal input line in the DSP of the optical network unit.

Beneficial effects of the present invention are as follows:

In the prior art, a current automatic cable distribution switch method requires that a terminal can gain local power; when a terminal cannot gain local power, the terminal cannot interact with a high layer, and the high layer cannot learn information indicating that a switch needs to be performed on the terminal; therefore, the high layer cannot send switch signaling to an automatic cable distribution switch apparatus, and the terminal cannot perform a switch between access network devices of different access networks or implement a switch, of the terminal, between different devices of a same access network. However, the embodiments of the present invention provide an automatic cable distribution switch apparatus, where the automatic cable distribution switch apparatus is connected to at least two access network devices, and includes a reverse power detection module configured to receive an access network device switch instruction sent by a terminal. When a terminal cannot gain local power, the reverse power detection module can still receive the access network device switch instruction sent by the terminal, thereby implementing interaction between the terminal and the automatic cable distribution switch apparatus. In this case, a relay control module of the automatic cable distribution switch apparatus adjusts a relay connected to the terminal sending the access network device switch instruction, so that the relay controls the connected terminal to switch from any access network device, currently connected to the terminal, of the at least two access network devices to another access network device of the at least two access network devices, thereby achieving an effect that automatic cable distribution switch can be performed when the terminal cannot gain local power.

DESCRIPTION OF EMBODIMENTS

Figure 1:
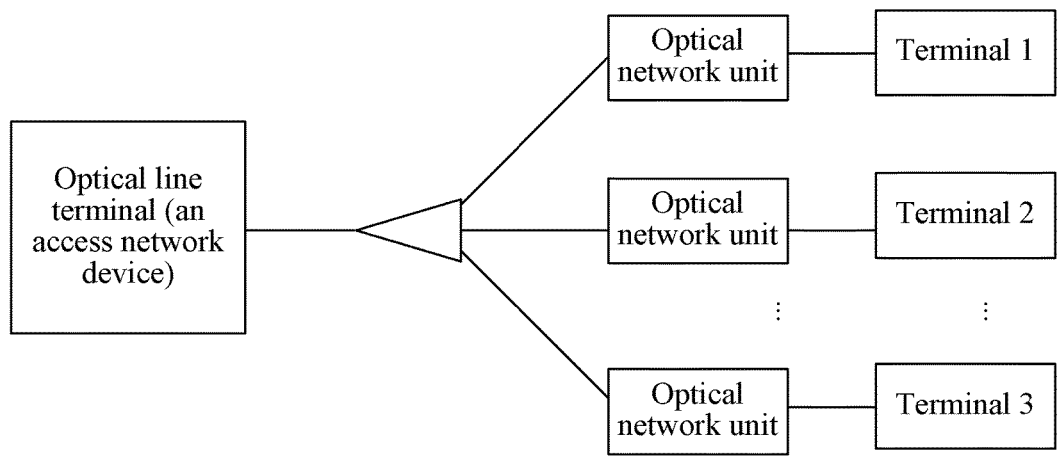
FIG. 1 is a schematic structural diagram of a PON system in the prior art.

To make the objectives, technical solutions, and advantages of the embodiments of the present invention clearer, the following clearly describes the technical solutions in the embodiments of the present invention with reference to the accompanying drawings in the embodiments of the present invention. Apparently, the described embodiments are some but not all of the embodiments of the present invention. All other embodiments obtained by persons of ordinary skill in the art based on the embodiments of the present invention without creative efforts shall fall within the protection scope of the present invention.

The term "and/or" in this specification describes only an association relationship for describing associated objects and represents that three relationships may exist. For example, A and/or B may represent the following three cases: Only A exists, both A and B exist, and only B exists. In addition, the character "/" in this specification generally indicates an "or" relationship between the associated objects.

An embodiment of the present invention provides an automatic cable distribution switch apparatus. The automatic cable distribution switch apparatus is connected to at least two access network devices, and includes at least one relay, a reverse power detection module connected to the at least one relay, and a relay control module that is connected to the reverse power detection module and the at least one relay, where each relay is configured to control a terminal, connected to the relay, to be connected to any access network device of the at least two access network devices within a different time period; the reverse power detection module is configured to receive an access network device switch instruction sent by the terminal; and the relay control module is configured to adjust a relay connected to the terminal sending the access network device switch instruction, so that the relay controls the connected terminal to switch from any access network device, currently connected to the terminal, of the at least two access network devices to another access network device of the at least two access network devices. In this solution, when the terminal cannot gain local power, the reverse power detection module can still receive the access network device switch instruction sent by the terminal, thereby implementing interaction between the terminal and the automatic cable distribution switch apparatus. In this case, the relay control module of the automatic cable distribution switch apparatus adjusts the relay 3 connected to the terminal sending the access network device switch instruction, so that the relay controls the connected terminal to switch from any access network device, currently connected to the terminal, of the at least two access network devices to another access network device of the at least two access network devices, thereby achieving an effect that automatic cable distribution switch can be performed when the terminal cannot gain local power.

The following describes in detail exemplary implementation manners of the present invention with reference to the accompanying drawings.

Embodiment 1

Figure 2:
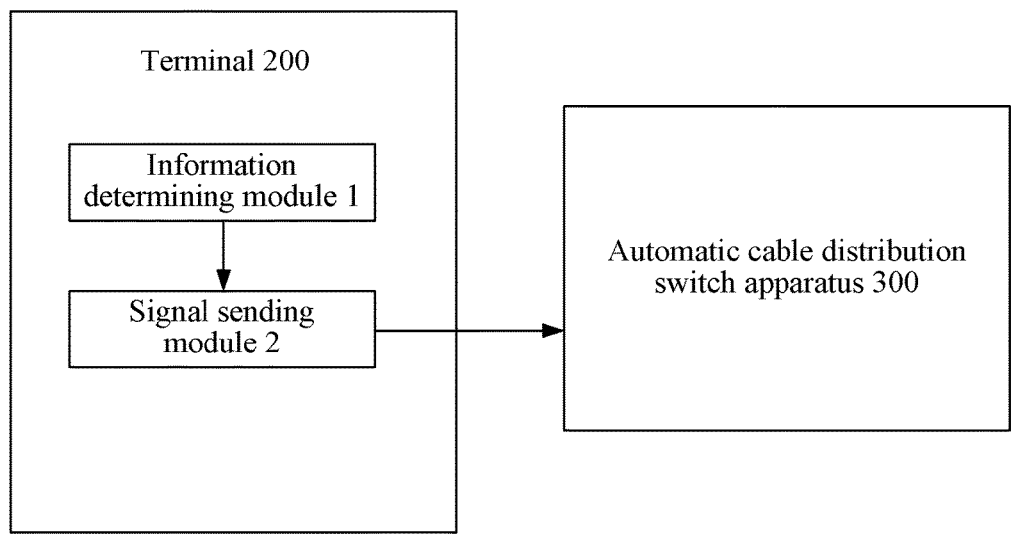
FIG. 2 is a schematic structural diagram of a terminal according to an embodiment of the present invention.

Referring to FIG. 2, this embodiment of the present invention provides a terminal 200. The terminal 200 includes:

an information determining module 1, configured to determine that the terminal 200 needs to switch from an access network device currently connected to the terminal 200 to another access network device; and a signal sending module 2, configured to: after the information determining module 1 determines that the terminal 200 needs to switch from an access network device currently connected to the terminal 200 to another access network device, send an access network device switch instruction to an automatic cable distribution switch apparatus 300, so that the automatic cable distribution switch apparatus 300 switches the terminal 200 from any access network device, currently connected to the terminal 200, of at least two access network devices connected to the automatic cable distribution switch apparatus 300 to another access network device of the at least two access network devices.

For example, the automatic cable distribution switch apparatus 300 is connected to a first device of an access network and a second device of the access network at the same time, and the terminal 200 is currently connected to the first device of the access network; when the terminal 200 needs to switch from the first device of the access network to the second device of the access network, the information determining module 1 of the terminal 200 determines that the terminal 200 needs to switch from the first device of the access network to the second device of the access network, and the signal sending module 2 of the terminal 200 sends an access network device switch instruction to the automatic cable distribution switch apparatus 300. Then, after receiving the access network device switch instruction, the automatic cable distribution switch apparatus 300 switches the terminal 200 from the first device of the access network to the second device of the access network.

In this solution, even though a terminal 200 cannot gain local power, when needing to switch from an access network device currently connected to the terminal 200 to another access network device, the terminal 200 may send an access network device switch instruction to an automatic cable distribution switch apparatus 300. In this case, when receiving the access network device switch instruction, the automatic cable distribution switch apparatus 300 may switch the terminal 200 from an access network device currently connected to the terminal 200 to another access network device connected to the automatic cable distribution switch apparatus 300, thereby achieving an effect that automatic cable distribution switch can be performed when the terminal 200 cannot gain local power.

Embodiment 2

Figure 3A:
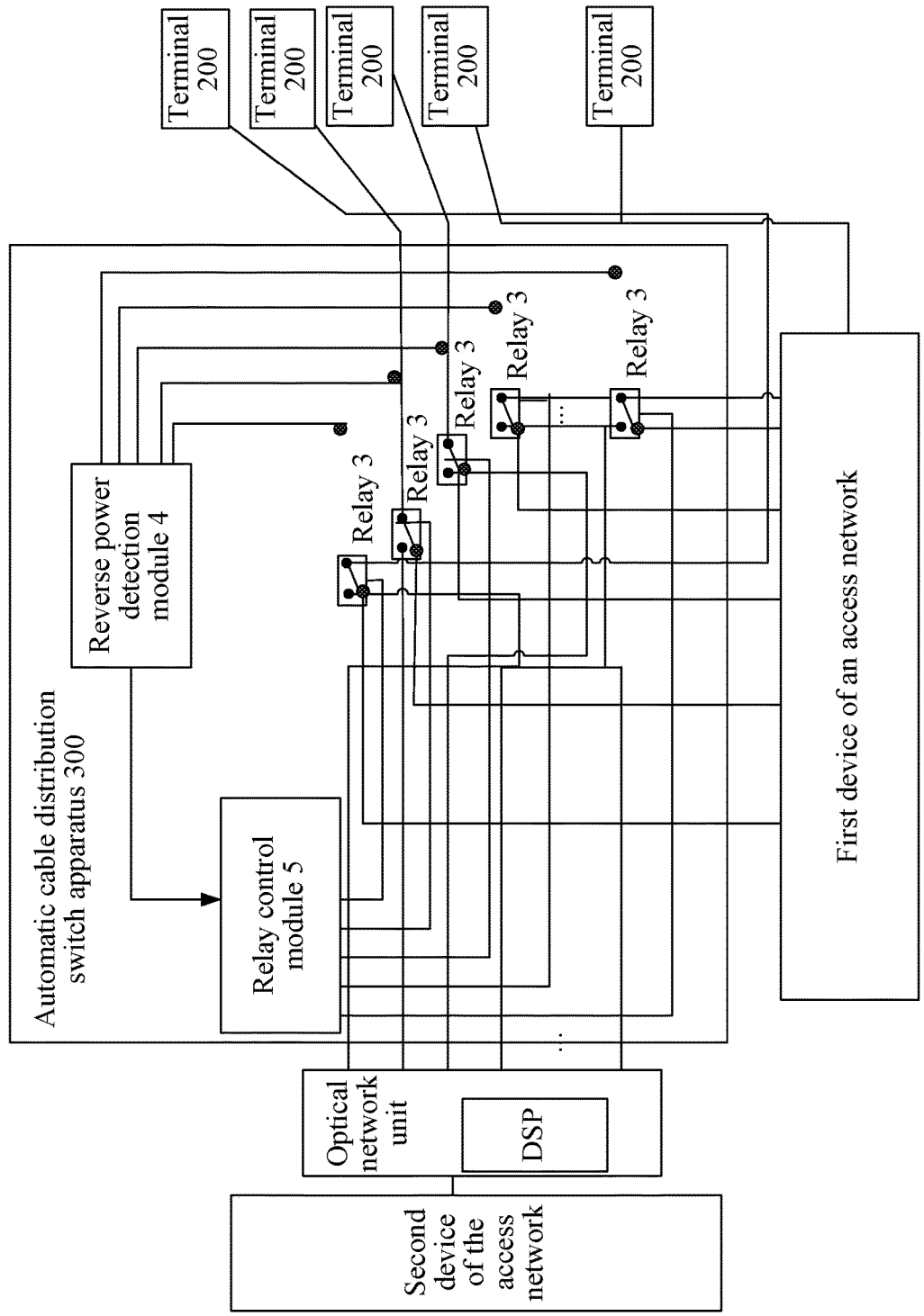
FIG. 3A is a schematic structural diagram of an automatic cable distribution switch apparatus according to an embodiment of the present invention.

Referring to FIG. 3A (this figure uses an example in which an automatic cable distribution switch apparatus 300 is connected to only two access network devices), this embodiment of the present invention provides an automatic cable distribution switch apparatus 300. The automatic cable distribution switch apparatus 300 is connected to at least two access network devices. The automatic cable distribution switch apparatus 300 includes at least one relay 3, a reverse power detection module 4 connected to the at least one relay 3, and a relay control module 5 that is connected to the reverse power detection module 4 and the at least one relay 3, where each relay 3 is configured to control a terminal 200, connected to the relay 3, to be connected to any access network device of the at least two access network devices within a different time period;

the reverse power detection module 4 is configured to receive an access network device switch instruction sent by the terminal 200; and the relay control module 5 is configured to adjust a relay 3 connected to the terminal 200 sending the access network device switch instruction, so that the relay 3 controls the connected terminal 200 to switch from any access network device, currently connected to the terminal, of the at least two access network devices to another access network device of the at least two access network devices.

In this embodiment of the present invention, the at least two access network devices connected to the automatic cable distribution switch apparatus 300 may be different devices of a same access network, or may be devices of different access networks.

In this embodiment of the present invention, there are multiple forms of the relay 3, for example, a single-throw double-pole switch. In an actual application, the relay 3 may also be in another form, and the relay 3 in a different form may be selected according to a different scenario, which is not described in detail herein again.

In this embodiment of the present invention, the reverse power detection module 4 may be configured to receive an electrical signal sent by the terminal 200; and in this case, the relay control module 5 may be configured to:

adjust a relay 3 connected to the terminal 200 sending the electrical signal, so that the relay 3 controls the connected terminal 200 to switch from any access network device, currently connected to the terminal 200, of the at least two access network devices to another access network device of the at least two access network devices.

Certainly, in this embodiment of the present invention, the reverse power detection module 4 may also be specifically configured to receive a switch signal that is delivered by the terminal by using an RNC (Radio Network Controller, radio network controller); and in this case, the relay control module 5 may also be configured to:

adjust a relay 3 connected to the terminal 200 sending the switch signal, so that the relay 3 controls the connected terminal 200 to switch from any access network device, currently connected to the terminal 200, of the at least two access network devices to another access network device of the at least two access network devices.

In this embodiment of the present invention, when the relay control module 5 adjusts the relay 3 connected to the terminal 200 sending the electrical signal, so that the relay 3 controls the connected terminal 200 to switch from any access network device, currently connected to the terminal 200, of the at least two access network devices to another access network device of the at least two access network devices, it may be that: only when a performance attribute information value of the electrical signal detected by the reverse power detection module 4 reaches a preset threshold, the relay control module 5 adjusts the relay 3 connected to the terminal 200 sending the electrical signal, so that the relay 3 controls the connected terminal 200 to switch from any access network device, currently connected to the terminal 200, of the at least two access network devices to another access network device of the at least two access network devices.

The foregoing descriptions are merely an implementation manner, and there are many other implementation manners in an actual application, which are not described in detail herein again.

In this embodiment of the present invention, the performance attribute information value obtained through detection by the reverse power detection module 4 may include information values of multiple types, for example, one of or any combination of a voltage value, a current value, and a power value, and certainly, in an actual application, may further include another performance attribute information value, which are not described in detail herein again.

In an actual application, after the terminal 200 is connected to an access network device, an analog signal sent by the terminal 200 needs to be processed before being input to the access network device by using a DSP of an optical network unit. In the prior art, routing selection, that is, a process in which an idle signal input line that is used to transmit a signal sent by a terminal is determined in a DSP of an optical network unit, is implemented in a manner of a relay group or motors; however, cross arrays are used for both the relay group and the motors, resulting in relatively large power consumption.

Figure 3B:
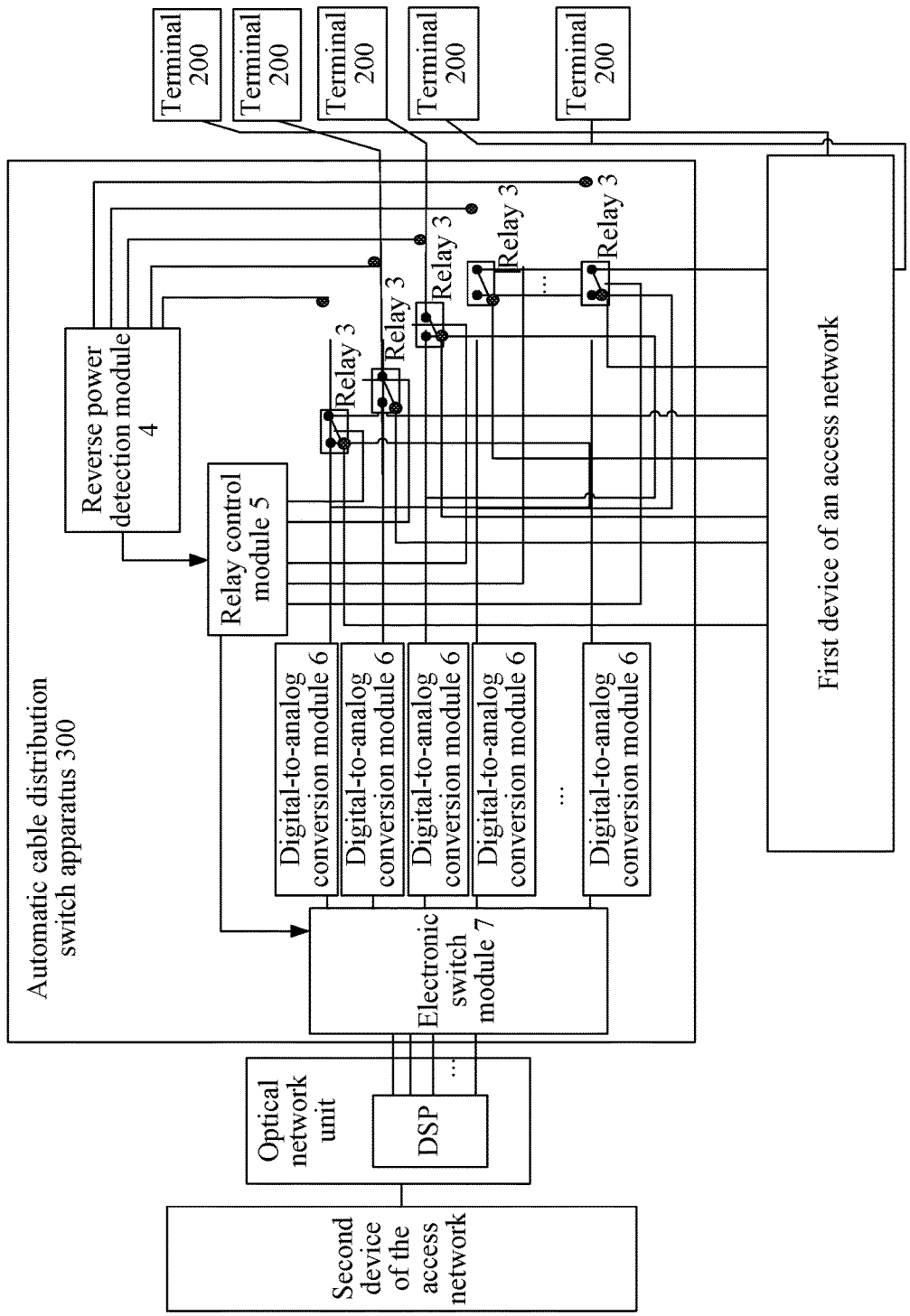
FIG. 3B is another schematic structural diagram of an automatic cable distribution switch apparatus according to an embodiment of the present invention.

In order to reduce power consumption, this embodiment of the present invention provides the automatic cable distribution switch apparatus 300. The apparatus further includes at least one digital-to-analog conversion module 6, and an electronic switch module 7 that is connected to the relay control module 5 and the at least one digital-to-analog conversion module 6, where each digital-to-analog conversion module 6 is connected to one terminal 200 by using one relay 3, as shown in FIG. 3B (this figure uses an example in which the automatic cable distribution switch apparatus 300 is connected to only two access network devices), where each digital-to-analog conversion module 6 is configured to convert an analog signal sent by a terminal 200 connected to the digital-to-analog conversion module 6 into a digital signal, and input the digital signal obtained through conversion to the electronic switch module 7;

the relay control module 5 is further configured to: after determining that the electronic switch module 7 receives the digital signal, control the electronic switch module 7 to determine, in a DSP of an optical network unit, an idle signal input line that is used to transmit a digital signal input by any digital-to-analog conversion module 6; and to input, to the switched access network device by using a corresponding idle signal input line in the DSP of the optical network unit, the digital signal that is input by any digital-to-analog conversion module 6; and the electronic switch module 7 is configured to: under the control of the relay control module 5, determine, in the DSP of the optical network unit, the idle signal input line that is used to transmit the digital signal input by the any digital-to-analog conversion module 6; and input, to the switched access network device by using the corresponding idle signal input line in the DSP of the optical network unit, the digital signal that is input by the any digital-to-analog conversion module 6.

In this solution, even though a terminal 200 cannot gain local power, when needing to switch from an access network device currently connected to the terminal 200 to another access network device, the terminal 200 may send an access network device switch instruction to a reverse power detection module 4. In this case, when receiving the access network device switch instruction, an automatic cable distribution switch apparatus 300 may switch the terminal 200 from the current access network device to another access network device, thereby achieving an effect that automatic cable distribution switch can be performed when the terminal 200 cannot gain local power.

Besides, in this embodiment, routing selection is implemented by using an electronic switch module 7, that is, the electronic switch module 7 determines, in a DSP of an optical network unit, an idle signal input line that is used to transmit a digital signal input by any digital-to-analog conversion module 6. A process in which the electronic switch module 7 performs routing selection consumes less power than a process in which a relay performs routing selection; therefore, power consumption is reduced.

Embodiment 3

Figure 4:
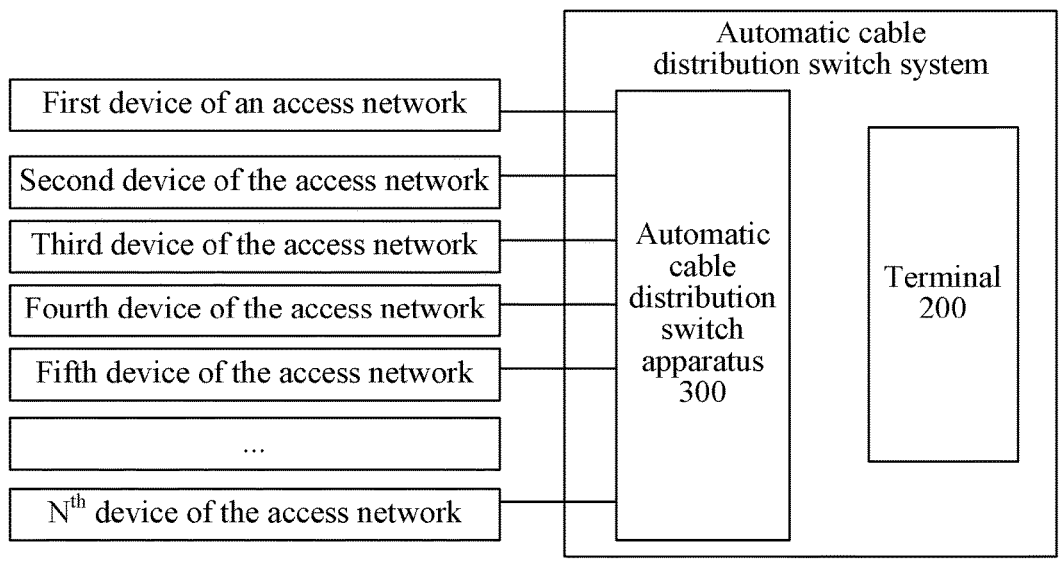
FIG. 4 is a schematic structural diagram of an automatic cable distribution switch system according to an embodiment of the present invention.

Referring to FIG. 4, this embodiment of the present invention further provides an automatic cable distribution switch system. The system includes the terminal 200 shown in FIG. 2 and the automatic cable distribution switch apparatus 300 shown in FIG. 3A or FIG. 3B, where the terminal 200 is configured to send an access network device switch instruction to the automatic cable distribution switch apparatus 300; and the automatic cable distribution switch apparatus 300 is configured to: after receiving the access network device switch instruction sent by the terminal 200, adjust a relay 3 connected to the terminal 200 sending the access network device switch instruction, so that the relay 3 controls the connected terminal 200 to switch from any access network device, currently connected to the terminal 200, of at least two access network devices to another access network device of the at least two access network devices.

In this embodiment of the present invention, optionally, the terminal 200 is configured to send an electrical signal to the automatic cable distribution switch apparatus 300; and in this case, optionally, the automatic cable distribution switch apparatus 300 is configured to:

adjust a relay 3 connected to the terminal 200 sending the electrical signal, so that the relay 3 controls the connected terminal 200 to switch from any access network device, currently connected to the terminal 200, of the at least two access network devices to another access network device of the at least two access network devices.

In this embodiment of the present invention, optionally, the terminal 200 is configured to deliver a switch signal by using an RNC; and in this case, optionally, the automatic cable distribution switch apparatus 300 is configured to:

adjust a relay 3 connected to the terminal 200 sending the switch signal, so that the relay 3 controls the connected terminal 200 to switch from any access network device, currently connected to the terminal 200, of the at least two access network devices to another access network device of the at least two access network devices.

Further, after the terminal 200 is connected to the access network device, the terminal 200 is further configured to send an analog signal; and the automatic cable distribution switch apparatus 300 is further configured to:

convert the analog signal sent by the terminal 200 into a digital signal;

determine, in a DSP of an optical network unit, an idle signal input line that is used to transmit the digital signal; and input the digital signal to the switched access network device by using a corresponding idle signal input line in the DSP of the optical network unit.

In this solution, even though a terminal 200 cannot gain local power, when needing to switch from an access network device currently connected to the terminal 200 to another access network device, the terminal 200 may send an access network device switch instruction to a reverse power detection module 4. In this case, when receiving the access network device switch instruction, an automatic cable distribution switch apparatus 300 may switch the terminal 200 from the current access network device to another access network device, thereby achieving an effect that automatic cable distribution switch can be performed when the terminal 200 cannot gain local power.

Besides, in this system, in this embodiment, the automatic cable distribution switch apparatus 300 implements routing selection by using an electronic switch module 7, that is, controls the electronic switch module 7 to determine, in a DSP of an optical network unit, an idle signal input line that is used to transmit a digital signal input by any digital-to-analog conversion module 6. A process in which the electronic switch module 7 performs routing selection consumes less power than a process in which a relay performs routing selection; therefore, power consumption is reduced.

Embodiment 4

Figure 5:
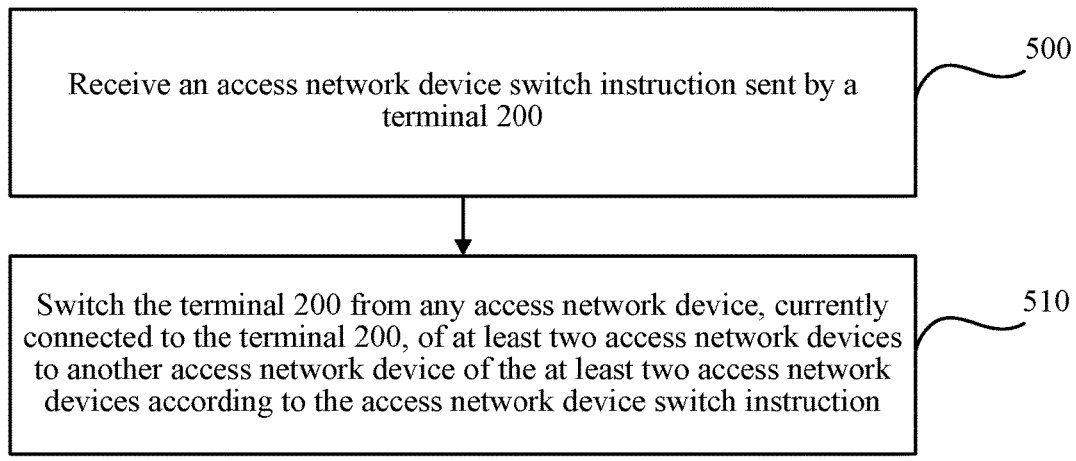
FIG. 5 is a flowchart of an automatic cable distribution switch method according to an embodiment of the present invention.

As shown in FIG. 5, this embodiment of the present invention provides an automatic cable distribution switch method, where an automatic cable distribution switch apparatus using the method is connected to at least two access network devices. A process of the method is as follows:

Step 500: Receive an access network device switch instruction sent by a terminal 200.

Step 510: Switch the terminal 200 from any access network device, currently connected to the terminal 200, of the at least two access network devices to another access network device of the at least two access network devices according to the access network device switch instruction.

In this embodiment of the present invention, there are multiple manners of receiving the access network device switch instruction sent by the terminal 200, which, for example, may be receiving an electrical signal sent by the terminal, or may be receiving a switch signal delivered by the terminal 200 by using an RNC. The foregoing descriptions are merely several implementation manners, and there are other manners in an actual application, which are not described in detail herein again.

Similarly, in this embodiment of the present invention, there also are multiple manners of switching the terminal 200 from any access network device, currently connected to the terminal 200, of the at least two access network devices to another access network device of the at least two access network devices according to the access network device switch instruction. For example:

the terminal 200 is switched from any access network device, currently connected to the terminal 200, of the at least two access network devices to another access network device of the at least two access network devices according to an electrical signal, or the terminal 200 is switched from any access network device, currently connected to the terminal 200, of the at least two access network devices to another access network device of the at least two access network devices according to a switch signal. The foregoing descriptions are merely several manners, and there are other manners in an actual application, which are not described in detail herein again.

In an actual application, when the terminal 200 is connected to an access network device, an analog signal sent by the terminal 200 needs to be processed before being input to the access network device by using a DSP of an optical network unit. Therefore, after the switching the terminal 200 from any access network device, currently connected to the terminal 200, of the at least two access network devices to another access network device of the at least two access network devices according to the access network device switch instruction, the method further includes the following operations:

converting the received analog signal sent by the terminal 200 into a digital signal;

determining, in a DSP of an optical network unit, an idle signal input line that is used to transmit the digital signal; and inputting the digital signal to the switched access network device by using a corresponding idle signal input line in the DSP of the optical network unit.

In this solution, even though a terminal 200 cannot gain local power, when needing to switch from an access network device currently connected to the terminal 200 to another access network device, the terminal 200 may send an access network device switch instruction to an automatic cable distribution switch apparatus 300. In this case, when receiving the access network device switch instruction, the automatic cable distribution switch apparatus 300 may switch the terminal 200 from the current access network device to another access network device, thereby achieving an effect that automatic cable distribution switch can be performed when the terminal 200 cannot gain local power.

In conclusion, the embodiments of the present invention provide an automatic cable distribution switch apparatus. The automatic cable distribution switch apparatus is connected to at least two access network devices, and includes at least one relay, a reverse power detection module connected to the at least one relay, and a relay control module that is connected to the reverse power detection module and the at least one relay, where each relay is configured to control a terminal, connected to the relay, to be connected to any access network device of the at least two access network devices within a different time period; the reverse power detection module is configured to receive an access network device switch instruction sent by the terminal; and the relay control module is configured to adjust a relay 3 connected to the terminal sending the access network device switch instruction, wherein the relay controls the connected terminal to switch from an access network device, currently connected to the terminal, of the at least two access network devices to another access network device of the at least two access network devices. In this solution, when the terminal cannot gain local power, the reverse power detection module can still receive the access network device switch instruction sent by the terminal, thereby implementing interaction between the terminal and the automatic cable distribution switch apparatus. In this case, the relay control module of the automatic cable distribution switch apparatus adjusts the relay 3 connected to the terminal sending the access network device switch instruction, wherein the relay controls the connected terminal to switch from an access network device, currently connected to the terminal, of the at least two access network devices to another access network device of the at least two access network devices, thereby achieving an effect that automatic cable distribution switch can be performed when the terminal cannot gain local power.

Besides, in this system, in this embodiment, the automatic cable distribution switch apparatus 300 further includes an electronic switch module 7, and implements routing selection by using the electronic switch module 7, that is, the electronic switch module 7 is controlled to determine, in a DSP of an optical network unit, an idle signal input line that is used to transmit a digital signal input by any digital-to-analog conversion module 6. A process in which the electronic switch module 7 performs routing selection consumes less power than a process in which a relay performs routing selection; therefore, power consumption is reduced.

The present invention is described with reference to the flowcharts and/or block diagrams of the method, the device (system), and the computer program product according to the embodiments of the present invention. It should be understood that computer program instructions may be used to implement each process and/or each block in the flowcharts and/or the block diagrams and a combination of a process and/or a block in the flowcharts and/or the block diagrams. These computer program instructions may be provided for a general-purpose computer, a dedicated computer, an embedded processor, or a processor of any other programmable data processing device to generate a machine, so that the instructions executed by a computer or a processor of any other programmable data processing device generate an apparatus for implementing a function in one or more processes in the flowcharts and/or in one or more blocks in the block diagrams.

These computer program instructions may also be stored in a computer readable memory that can instruct the computer or any other programmable data processing device to work in a specific manner, so that the instructions stored in the computer readable memory generate an artifact that includes an instruction apparatus. The instruction apparatus implements a function in one or more processes in the flowcharts and/or in one or more blocks in the block diagrams.

These computer program instructions may also be loaded onto a computer or another programmable data processing device, so that a series of operations and steps are performed on the computer or the another programmable device, thereby generating computer-implemented processing. Therefore, the instructions executed on the computer or the another programmable device provide steps for implementing a function in one or more processes in the flowcharts and/or in one or more blocks in the block diagrams.

Although the foregoing embodiments of the present invention have been described, persons skilled in the art can make changes and modifications to these embodiments once they learn the basic inventive concept. Therefore, the following claims are intended to be construed as to cover the foregoing embodiments and all changes and modifications falling within the scope of the present invention.

Obviously, persons skilled in the art can make various modifications and variations to the embodiments of the present invention without departing from the spirit and scope of the embodiments of the present invention. The present invention is intended to cover these modifications and variations provided that they fall within the scope of protection defined by the following claims and their equivalent technologies.

What is claimed is:

1. An automatic cable distribution switch apparatus, wherein the automatic cable distribution switch apparatus is connected to at least two access network devices, and comprises:
   at least one relay;
   a reverse power detector connected to the at least one relay; and
   a relay controller that is connected to the reverse power detector and the at least one relay, wherein
   each relay is configured to control a terminal, connected to the relay, to be connected to any access network device of the at least two access network devices within a different time period;
   the reverse power detector is configured to receive an access network device switch instruction sent by the terminal; and
   the relay controller is configured to adjust a relay connected to the terminal sending the access network device switch instruction, wherein the relay controls the connected terminal to switch from an access network device, currently connected to the terminal, to another access network device of the at least two access network devices.

2. The apparatus according to claim 1, wherein the relay is a single-throw double-pole switch.

3. The apparatus according to claim 1, wherein the reverse power detector is configured to:
   receive an electrical signal sent by the terminal; and
   the relay controller is configured to:
   adjust a relay connected to the terminal sending the electrical signal, wherein the relay controls the connected terminal to switch from an access network device, currently connected to the terminal, to another access network device of the at least two access network devices.

4. The apparatus according to claim 1, wherein the reverse power detector is configured to:
   receive a switch signal that is delivered by the terminal by using a radio network controller RNC; and
   the relay controller is configured to:
   adjust a relay connected to the terminal sending the switch signal, wherein the relay controls the connected terminal to switch from an access network device, currently connected to the terminal, to another access network device of the at least two access network devices.

5. The apparatus according to claim 1, further comprising at least one digital-to-analog converter and an electronic switch connected to both the relay controller and the at least one digital-to-analog converter, wherein each digital-to-analog converter is connected to one terminal by using one relay, wherein
   each digital-to-analog converter is configured to convert an analog signal sent by a terminal connected to the digital-to-analog converter into a digital signal, and input the digital signal obtained through conversion to the electronic switch;

the relay controller is further configured to: after determining that the electronic switch receives the digital signal, control the electronic switch to determine, in a digital signal processor DSP of an optical network unit, an idle signal input line that is used to transmit a digital signal input by any digital-to-analog converter; and to input, to the switched access network device by using a corresponding idle signal input line in the DSP of the optical network unit, the digital signal that is input by any digital-to-analog converter; and the electronic switch is configured to: under the control of the relay controller, determine, in the DSP of the optical network unit, the idle signal input line that is used to transmit the digital signal input by the any digital-to-analog converter; and input, to the switched access network device by using the corresponding idle signal input line in the DSP of the optical network unit, the digital signal that is input by the any digital-to-analog converter.

6. An automatic cable distribution switch system, comprising:
   a terminal; and
   an automatic cable distribution switch connected to at least two access network devices, wherein
   the terminal is configured to send an access network device switch instruction to the automatic cable distribution switch; and
   the automatic cable distribution switch is configured to: after receiving the access network device switch instruction sent by the terminal, adjust a relay connected to the terminal sending the access network device switch instruction, wherein the relay controls the connected terminal to switch from an access network device, currently connected to the terminal, to another access network device of the at least two access network devices.

7. The system according to claim 6, wherein the terminal is configured to:
   send an electrical signal to the automatic cable distribution switch apparatus; and
   the automatic cable distribution switch is configured to:
   adjust a relay connected to the terminal sending the electrical signal, wherein the relay controls the connected terminal to switch from an access network device, currently connected to the terminal, to another access network device of the at least two access network devices.

8. The system according to claim 6, wherein the terminal is configured to:
   deliver a switch signal by using a radio network controller RNC; and
   the automatic cable distribution switch is configured to:
   adjust a relay connected to the terminal sending the switch signal, wherein the relay controls the connected terminal to switch from an access network device, currently connected to the terminal, to another access network device of the at least two access network devices.

9. The system according to claim 6, wherein the terminal is further configured to send an analog signal; and
   the automatic cable distribution switch is further configured to:
   convert the analog signal sent by the terminal into a digital signal;
   determine, in a digital signal processor DSP of an optical network unit, an idle signal input line that is used to transmit the digital signal; and
   input the digital signal to the switched access network device by using a corresponding idle signal input line in the DSP of the optical network unit.

10. An automatic cable distribution switch method, wherein an automatic cable distribution switch apparatus using the method is connected to at least two access network devices, and the method comprises:
    controlling a terminal to be connected to any access network device of the at least two access network devices within a different time period;
    receiving an access network device switch instruction sent by the terminal;
    adjusting a relay connected to the terminal sending the access network device switch instruction; and
    switching the terminal from any access network device, currently connected to the terminal, to another access network device of the at least two access network devices according to the access network device switch instruction.

11. The method according to claim 10, wherein the receiving an access network device switch instruction sent by a terminal comprises:
    receiving an electrical signal sent by the terminal; and
    the switching the terminal from any access network device, currently connected to the terminal, to another access network device of the at least two access network devices according to the access network device switch instruction comprises:
    switching the terminal from any access network device, currently connected to the terminal, to another access network device of the at least two access network devices according to the electrical signal.

12. The method according to claim 10, wherein the receiving an access network device switch instruction sent by a terminal comprises:
    receiving a switch signal that is delivered by the terminal by using a radio network controller RNC; and
    the switching the terminal from any access network device, currently connected to the terminal, to another access network device of the at least two access network devices according to the access network device switch instruction comprises:
    switching the terminal from any access network device, currently connected to the terminal, to another access network device of the at least two access network devices according to the switch signal.

13. The method according to claim 10, after the switching the terminal from any access network device, currently connected to the terminal, to another access network device of the at least two access network devices according to the access network device switch instruction, further comprising:
    converting a received analog signal sent by the terminal into a digital signal;
    determining, in a digital signal processor DSP of an optical network unit, an idle signal input line that is used to transmit the digital signal; and
    inputting the digital signal to the switched access network device by using a corresponding idle signal input line in the DSP of the optical network unit.

* * * * *